US011908313B2

(12) United States Patent
Paine et al.

(10) Patent No.: US 11,908,313 B2
(45) Date of Patent: Feb. 20, 2024

(54) LIGHTING SYSTEM AND METHOD OF USE THEREOF

(71) Applicant: IoT Automation Global Pty Ltd, Tallai (AU)

(72) Inventors: Robin Paine, Tallai (AU); Greg James, Tallai (AU)

(73) Assignee: IOT AUTOMATION GLOBAL PTY LTD, Queensland (AU)

( * ) Notice: Subject to any disclaimer, the term of this patent is extended or adjusted under 35 U.S.C. 154(b) by 343 days.

(21) Appl. No.: 17/370,117

(22) Filed: Jul. 8, 2021

(65) Prior Publication Data

US 2021/0343125 A1 Nov. 4, 2021

Related U.S. Application Data

(63) Continuation-in-part of application No. PCT/AU2019/050016, filed on Jan. 11, 2019.

(51) Int. Cl.

| | |
|---|---|
| ***G08B 7/06*** | (2006.01) |
| ***H05B 45/20*** | (2020.01) |
| ***H05B 47/105*** | (2020.01) |
| ***G08B 5/38*** | (2006.01) |

(52) U.S. Cl.

CPC ............... *G08B 7/066* (2013.01); *G08B 5/38* (2013.01); *H05B 45/20* (2020.01); *H05B 47/105* (2020.01)

(58) Field of Classification Search

CPC ...................................................... G08B 7/066

See application file for complete search history.

(56) References Cited

U.S. PATENT DOCUMENTS 7,800,511 B1 * 9/2010 Hutchison .............. G08B 7/066 340/3.1
2017/0316660 A1 * 11/2017 Chong ..................... G08B 5/36

FOREIGN PATENT DOCUMENTS

CN 104806286 A 7/2015

OTHER PUBLICATIONS

International Search Report (ISR) for PCT/AU2019/050016 dated Mar. 4, 2019 (5 pages).
Written Opinion (WO) or PCT/AU2019/050016 dated Mar. 4, 2019 (4 pages).

* cited by examiner

*Primary Examiner* — Travis R Hunnings
(74) *Attorney, Agent, or Firm* — Shumaker, Loop & Kendrick, LLP; Jason A. Smith

(57) ABSTRACT

A lighting system and method of use is disclosed for use with an underground passageway. The lighting system includes a base station having at least one power source, and a plurality of light modules extending from the base station in a serial arrangement and spaced at least partially along a length of a passageway. Each light module is capable of emitting light for ordinary operations within the passageway and at least one visual signal. The system further includes at least one cable extending from the base station and interconnecting the light modules with the base station and the power source and a controller operatively associated with the base station and in communication with at least one sensor configured to sense an environmental condition. The controller is configured to continuously monitor said sensor and activate the at least one visual signal when an abnormal or emergency environmental condition is detected.

15 Claims, 8 Drawing Sheets

LIGHTING SYSTEM AND METHOD OF USE THEREOF

CROSS-REFERENCE TO RELATED APPLICATIONS

This application is a continuation in part of the US designation of International Application No. PCT/AU2019/050016, filed Jan. 11, 2019, the contents of which is incorporated herein by reference in its entirety.

TECHNICAL FIELD

The present invention relates to a system and method for providing lighting in an underground passageway, particularly an underground mine.

BACKGROUND

Underground or sub-surface mining involves the digging of tunnels or shafts into an earthen surface to reach buried target materials, such as, e.g., ores or coal. In such environments, it is desirable to provide adequate lighting for miners and other operations personnel to work within a safe and controlled environment.

Generally, underground mining operations utilise a combination of fixed and mobile light modules. The fixed light modules may typically be tungsten filament or fluorescent lamps used to illuminate underground openings, such as, e.g., shaft stations, conveyors, travel ways, tool rooms and the like. Conversely, the mobile light modules may be battery-operated personal lamps carried by each individual miner or operations personnel.

Despite the above, the provision of adequate lighting remains a challenge in underground mining operations due to a dynamic nature of the working environment and sparse use of fixed light modules. For example, dust, confined spaces and surfaces that poorly reflect light contribute to a dynamic environment with low visual contrasts.

Another problem with underground mining operations is the real-time communication of information to miners and other operations personnel regarding the status of work areas, including emergency conditions and/or events, such as, e.g., seismic activity, fire, mud rush, gas exposure or other geotechnical hazardous events.

Generally, non-emergency communications may be disseminated through normal communication means, such as, e.g., by email, printed notices displayed in offices and work areas and physical signage, whereas emergency communications may be transmitted via radios, sirens and the like.

However, problems with both communication means is that they are easily overlooked, misheard or not heard at all due to local operational noises/distractions.

Conversely, when such emergency communication means are heard, miners or other operations personnel may easily become disorientated when evacuating an area of a mine again due to the dynamic environment and low light conditions.

Moreover, with non-emergency communications, it is not uncommon for the information to quickly become dated due to the rapidly changing dynamic environment. For example, a cave front may move 5-20 m per week.

SUMMARY OF INVENTION

Embodiments of the present invention provide a lighting system for use along a length of an underground passageway and a method of use thereof, which may at least partially overcome one or more of the abovementioned problems or disadvantages, or provide the consumer with a useful or commercial choice.

According to a first aspect of the present invention, there is provided a lighting system for use along a length of an underground passageway, the system including:

a base station located at or near an end of the length of the passageway, said base station including at least one power source;

a plurality of light modules extending from the base station in a serial arrangement and spaced at least partially along the length, each light module configured to emit light for ordinary operations within the passageway and at least one visual signal;

at least one cable extending from the base station and interconnecting the light modules with the base station and the power source; and a controller operatively associated with the base station, said controller being in communication with at least one sensor configured to sense an environmental condition, said controller configured to continuously monitor said sensor and selectively activate the at least one visual signal of any one of the light modules when an abnormal or emergency said environmental condition is detected and upon receiving a manual command.

According to second aspect of the present invention, there is provided a lighting system for use along a length of an underground passageway, the system including:

a base station located at or near an end of the length of the passageway, said base station including at least one power source;

a plurality of light modules extending from the base station in a serial arrangement and spaced at least partially along the length, each light module configured to emit light for ordinary operations within the passageway and at least one visual signal;

at least one cable extending from the base station and interconnecting the light modules with the base station and the power source; and a controller operatively associated with the base station, said controller configured selectively activate the at least one visual signal of any one of the light modules upon receiving a manual command.

According to a third aspect of the present invention, there is provided a base station for use or when used with the system of the first or second aspects, said base station configured to be located at or near an end of a length of an underground passageway, said base station including at least one power source.

According to a fourth aspect of the present invention, there is provided a light module for use or when used with the system of the first or second aspects, said light module configured to be arranged with other like light modules in a spaced and serial arrangement at least partially along a length of an underground passageway, said light module capable of emitting light for ordinary operations within the passageway and at least one visual signal.

According to a fifth aspect of the present invention, there is provided a controller for use or when used with the system of the first aspect, said controller operatively associated with a base station of the system and in communication with at least one sensor configured to sense an environmental condition within or near an underground passageway, said controller configured to continuously monitor said sensor and selectively activate at least one visual signal of any one of a plurality of light modules arranged along a length of the underground passageway when an abnormal or emergency said environmental condition is detected.

Advantageously, the lighting system of the present invention conveniently not only provides superior lighting in underground passageways than conventional fixed light modules but also provides a means for visually communicating to nearby persons when an abnormal or emergency environmental event has occurred. Moreover, the communication means provided by the system is superior to conventional communication means as it provides a blatant signal that is not masked by locational operational noises. Further, embodiments of the system, in addition to communicating when an abnormal or emergency environmental event has occurred, are also able to direct persons away from the location where the environmental event has occurred to a safe zone.

As indicated above, the system is configured for providing lighting along a length of an underground passageway, preferably of an underground mine. The system is also configured to continuously monitor at least one sensor and selectively activate the at least one visual signal when an abnormal or emergency environmental condition is detected.

The passageway may be of any suitable size, shape and construction to allow the passageway of miners, other operations personnel and/or vehicles. For example, the passageway may have a length of about 10 m to about 1,500 m, typically a length between 50 m and 500 m.

Generally, each passageway may extend in a linear or non-linear direction between a pair of opposed ends. One or more passageways may branch off or form a junction with a first passageway.

The abnormal or emergency environmental condition may include any condition that is hazardous to nearby miners and/or other operations personnel within the underground passageway. For example, the abnormal or emergency environmental condition may include, but is not limited to, fire, gas leaks, air blasts, flammable or toxic fluid leaks, seismic activity, subsidence, high pore water pressure, mud rush, operational hazards (such as vehicle collisions or work site accidents) and other conditions that may be hazardous or indicative of a passageway collapse. Typically, such environmental conditions may also be referred to as environmental events.

In some embodiments, the at least one visual signal of any one of the plurality of light modules arranged along a length of the underground passageway may be selectively activated in response to non-environmental conditions.

For example, in some such embodiments, the at least one visual signal of any one of the plurality of light modules may be selectively activated to illuminate ahead and behind the path of a heavy vehicle to indicate the approach of the heavy vehicle. Typically, the light modules may be selectively activated by manual command input.

In other such embodiments, the at least one visual signal of any one of the plurality of light modules may be selectively activated to provide guidance lighting along a shortest route to a desired location, such as, e.g., safe zone, a refuge chamber, an evacuation route. Again, the light modules may typically be selectively activated by manual command input.

The at least one sensor may include one or more sensors capable of sensing one of the above environmental conditions or conditions conducive to one of the above environmental conditions. For example, the at least one sensor may include, but is not limited to, a smoke sensor, an infrared sensor, a seismic activity sensing device, a subsidence measuring device, and a pore water pressure measuring device.

As indicated, the system includes a base station. The base station may be of any suitable size, shape and construction and may be formed from any suitable material or materials.

Generally, the base station may be located at or near a first end of the length of the underground passageway, preferably so that the plurality of light modules may extend from the base station in a serial arrangement at least partially towards a second end of the length.

The base station may include a body sized and shaped for housing components and/or parts of the system, including the at least one power source.

The body may include an access door or panel for accessing internal contents of the base station.

The body may include one or more externally visible indicators, such as e.g., light-emitting diodes (LEDs), for indicating the operational status of the system.

The body may be adapted to be mounted to, or adjacent to, a sidewall of the passageway, preferably such that the base station is at a height for convenient access by miners or operations personnel.

The body may include at least one cable port for coupling or connecting with the at least one cable connecting the light modules to the base station. The at least one cable port may preferably include an electrical connector for at least connecting the light modules with the power source in the base station. In some embodiments, the electrical connector may preferably be a DEUTSCH connector.

In preferred embodiments, the body may include more than one cable port for connecting the base station to multiple lines or strings of light modules.

As indicated, the body of the base station may house the at least one power source for powering the light modules and other electrical components of the system. The at least one power source may include an on-board power source, such as, e.g., one or more batteries. Typically, however, the at least one power source may include a primary input power source, such as, e.g., a generator or a mains power supply.

In some embodiments, the base station may further include a second redundant power source for supplying power to the light modules and other electrical components of the system when the primary input power source fails.

In preferred embodiments, the base station may include an uninterruptible power source (UPS) system including one or more batteries. In such embodiments, the UPS system may be a standby or line-interactive system.

For example, in embodiments in which the UPS system is a standby system, backup power circuitry may be invoked when the primary input power source fails.

Conversely, in embodiments in which the UPS system is a line-interactive system, the system further includes a charger for charging the one or more batteries during normal operation. When the primary input power source fails, backup power circuitry may redirect power from the one or more batteries to supply current to a remainder of the system.

Any suitable type of battery may be used that has the following properties: durability; cycle durability; and charge/discharge efficiency. Preferably, a battery type may be selected that may provide a run time of at least 4 hours when the primary input power source fails.

In some embodiments, the base station may include a communications module for connecting the base station to the controller. The base station may connect to the controller in any suitable way.

For example, the communications module may be in the form of a modem enabling the base station to connect to the controller via a wired or wireless network.

In some embodiments, the communications module may include a port or access point (e.g., a USB port, a mini-USB port or an Ethernet port) such that the base station may be connected to an external processing device using a suitable cable.

In other embodiments, the communications module may be a wireless communications module, such as, e.g., a wireless network interface controller, such that the base station may wirelessly connect to the controller through a wireless network (e.g., Wi-Fi (WLAN) communication, Satellite communication, RF communication, infrared communication, or Bluetooth™).

The base station may include a microcomputer, including one or more processors and a memory. The processors may include multiple inputs and outputs coupled to other electronic components of the system.

For example, the processors may have an input coupled to the communications module.

For example, the processors may have an output coupled to each light module, preferably the visual signalling device of each light module.

The base station may be addressable and may report an operational status to an external device when polled, e.g., by the controller. The operational status may include a status of any one of the interconnected light modules.

As indicated, the system includes a plurality of light modules configured to be spaced at least partially along the length of the passageway, preferably in series (one after another).

The plurality of light modules may include any suitable number for at least partially spanning the length of the passageway. For example, the plurality of light modules may include about 5, about 10, about 15, about 20, about 25, about 30, about 35, about 40, about 45, about 50, about 55, about 60, about 65, about 70, about 75, about 80, about 85, about 90, about 95, about 100, about 105, about 110, about 115, about 120, about 125, about 130, about 135, about 140, about 145 or even about 150 or more light modules spaced at least partially along the length of the passageway. Typically, the plurality of light modules may include up to about 100 light modules.

The light modules may be spaced at regular intervals at least partially along the length. For example, the light modules may be spaced at intervals of about 1 m, about 2 m, about 3 m, about 4 m, about 5 m, about 6 m, about 7 m, about 8 m, about 9 m, about 10 m, about 15 m, about 20 m, about 25 m, about 30 m, about 35 m, about 40 m, about 45 m, about 50 m, about 55 m, about 60 m, about 65 m, about 70 m, about 75 m, about 80 m, about 85 m, about 90 m, about 95 m, about 100 m, about 105 m, about 110 m, about 115 m, about 120 m, about 125 m, about 130 m, about 135 m, about 140 m, about 145 m, about 150 m, about 155 m, about 160 m, about 165 m, about 170 m, about 175 m, about 180 m, about 185 m, about 195 m, or even about 200 m along the length of a passageway. Typically, the light modules may be spaced at regular intervals of from about 5 m to about 100 m along a length of a passageway depending on a desired lighting effect and application.

In some embodiments, the system may be used to provide lighting to more than one underground passageway. The base station may be located at a junction between two or more passageways and pluralities of light modules may extend from the base station and at least partially along a length of each passageway.

For example, a first plurality of light modules may extend from the base station at least partially along a length of a first passageway and a second plurality of light modules, separate from the first plurality, may extend from the base station at least partially along a length of the second passageway.

Each light module may include at least one visual signalling device for emitting light and the at least one visual signal.

Each light module may further include a body configured to house the at least one visual signalling device and other components of the light module. The body may configured to be mounted to a wall or ceiling of the underground passageway, typically via one or more fasteners and/or a bracket, preferably one or more rock anchors.

The body may be of any suitable size, shape and construction and may be formed from any suitable materials or materials. The body may be of unitary construction or may be formed from two or more body pieces, typically the latter.

Generally, the body may be formed from material or materials capable of withstanding the rigorous conditions of an underground mine. For example, the body may be formed from durable material or materials that are substantially shock resistant, high and/or low temperature resistant, pressure resistant and waterproof. The body may be formed from plastic and/or metal material or materials.

The body may include a rear plate, an opposed front cover and at least one sidewall extending therebetween. The front cover may be detachable.

The rear plate and the opposed front cover may be of any suitable shape and size, preferably the same.

For example, in some embodiments, the rear plate and the cover may be rectangular and four sidewalls may extend therebetween.

In preferred embodiments, the rear plate and cover may be circular or oval-shaped and a curved sidewall or collar may extend therebetween.

The rear plate and at least one sidewall may be mounted to the wall or ceiling of the passageway via one or more rock anchors received in mounting lugs extending outwardly from an edge of the rear plate.

The front cover may be rounded, preferably having a convex curvature. The front cover may be substantially dome-shaped. The front cover may preferably be transparent or at least a central portion may be transparent to enable light to pass through.

In preferred embodiments, the front cover may at least partially function as a lens for the at least one visual signalling device housed within the body.

The at least one sidewall may include one or more cable ports for at least partially receiving a portion of the at least one cable interconnecting the light module with the base station and other light modules. Each cable port may preferably include an electrical connector for connecting the at least one visual signalling device and other light module electrical components with the power source in the base station. The electrical connector may preferably be a DEUTSCH connector.

In preferred embodiments, the at least one sidewall of the body of the light module may include at least two cable ports and associated electrical connectors located on diametrically opposite sides of the body to assist in connecting the light modules in a serial arrangement.

The various body pieces may be connectable together in any suitable way.

For example, in some embodiments, the front cover may be fastened to the rear plate and at least one sidewall with at least one fastener. The at least one fastener may include one or more mechanical fasteners and/or one or more chemical fasteners.

The one or more chemical fasteners may include a wet adhesive, a dry adhesive and/or double-sided adhesive tape that may extend between the rear plate and the at least one sidewall and between the at least one sidewall and the front cover.

The one or more mechanical fasteners may include threaded fasteners, which may extend through openings defined in or near the peripheral edge of the rear plate and the front cover and into a portion of the at least one sidewall.

In other embodiments, the rear plate, front cover and at least one sidewall may be connected together by a connecting mechanism or part of a connecting mechanism. The connecting mechanism or part of the connecting mechanism may be of integral formation with each component or piece of the body.

The connecting mechanism may include a mateable male and female portions that couple together, such as, e.g., a threaded connection or an interference (snap fit) connection.

For example, in some embodiments, the rim or peripheral edge of the rear plate and/or the front cover may include a female portion configured to at least partially receive or be coupled with a male formation associated with one or both end edges of the at least one sidewall.

Conversely, in other embodiments, the rim or peripheral edge of the rear plate and/or the front cover may include a male formation configured to be at least partially inserted into or coupled with a female formation associated with one or both end edges of the at least one sidewall.

In some embodiments, a gasket or sealing member and/or sealing agent may be attached to or applied along the rim or peripheral edge of the rear plate and/or the front cover to assist in forming a substantially water-tight seal between the rear plate and the at least one sidewall and/or the front cover and the at least one sidewall. For example, the gasket or sealing member may be in the form of a strip of foam attached to one or both rims or peripheral edges. Alternatively, the gasket may be a rubber O-ring. Any suitable sealing agent may be used, such as, e.g., a mastic sealant or the like.

As indicated, each light module may include at least one visual signalling device capable of emitting light for ordinary operations and the at least one visual signal. The at least one visual signal may be a light, and the at least one visual signalling device may be a light source. In preferred embodiments, the at least one visual signalling device may be a light emitting diode (LED).

For example, the visual signal may include one or more flashing lights, constant lights or coloured lights, or any combination thereof.

In some embodiments, the visual signal may be a constant red light to indicate a hazardous zone or no-entry zone, for example.

Conversely, in other embodiments, the visual signal may be a constant green light to indicate a non-hazardous zone or safe zone.

In yet other embodiments, the visual signal may be a flashing red light to indicate that the zone should be immediately evacuated In yet further embodiments, the light modules of the system may emit a coordinated sequential flashing light to indicate that a zone should be evacuated in a particular direction, such as, e.g., towards a known non-hazardous "green" zone. For example, the light modules may emit a flashing red light in a sequential manner towards or away from the base station to indicate that a person should evacuate the zone by either heading towards or away from the base station.

In some embodiments, the at least one visual signal may be capable of emitting light or lights in different colours. For example, the at least one visual signal may be capable of emitting at least white, green and red light.

In other embodiments, the light module may include a plurality of visual signalling devices capable of emitting light in different colours. For example, the light module may include visual signalling devices capable of emitting at least white, green and red light.

In yet other embodiments, each light module may include a plurality of visual signalling devices of which subsets may be capable of emitting one of at least white, green and red light. Preferably, the plurality of visual signalling devices may include a plurality of LEDs.

The plurality of LEDs may include any suitable number of LEDs. For example, the plurality may include 3, 4, 5, 6, 7, 8, 9, 10, 11, 12, 13, 14, 15, 16, 17, 18, 19, 20, 21, 22, 23, 24, 25, 26, 27, 28, 29 or even 30 or more LEDs. In some embodiments, the plurality of LEDs may include a redundant subset of LEDs.

In preferred embodiments, the plurality of LEDs may be arranged in an array including a mixture of LEDs capable of emitting light in different colours. For example, the plurality of LEDs may include 18 LEDs arranged in an array, including two redundant banks of 9 LEDs each. Each bank of LEDs may include red LEDs, green LEDs and white LEDs, for example.

In some embodiments, each light module may include a reflector for redirecting light towards and through the front cover. The reflector may be located between the at least one visual signalling device and the rear cover.

Each light module may include a dedicated microprocessor operatively associated with the at least one visual signalling device for controlling operation of the at least one visual signalling device in response to receiving instructions from the controller or the at least one sensor.

Each light module may be connected to the base station by an electrical circuit extending along the at least one cable. The electrical circuit may include a data bus, a twisted pair network and/or a fibre optic network, for example. Excitation/operating voltage may be supplied over the circuit (such as POE) or separately.

In some embodiments, each light module may further include a wireless communications module, such as, e.g., a wireless network interface controller, such that the light module may wirelessly connect to an external device via a wireless network (e.g., Wi-Fi (WLAN) communication, Satellite communication, RF communication, infrared communication, or Bluetooth™) Advantageously, the wireless communications module may provide a redundant wireless communications path in the event of cable damage connecting the light module to the base station. Additionally, the wireless communication module associated with each light module may enable each light module to wirelessly connect to other wireless sensors and infrastructure and act as a redundant high bandwidth backhaul connection.

In some such embodiments, each light module may include a radio-frequency identification ("RFID") reader for interrogating RFID tags that pass through an interrogation zone associated with each light module. Advantageously, this enables the light modules of the system to be used to identify the location of an RFID tag associated with a person, vehicle or mining asset in one or more underground passageways fitted with the system of the present invention.

In some embodiments, each light module may further include a redundant power source for powering the at least one visual signalling device and other electrical components of the light module in the event of cable damage connecting the light module to the power source associated with the base station. The redundant power source may include an on-board power source, such as, e.g., one or more batteries, preferably rechargeable batteries.

In preferred such embodiments, the redundant power supply may include an inbuilt 1.5 Ah+3.75 VDC lithium ion rechargeable battery.

Advantageously, when the at least one visual signalling device is drawing power from the redundant power supply, the intensity of the at least one visual signalling device may reduce to maximise the duration of the power supply. For example, the redundant power supply may provide 3 hours or more of run time.

Each light module may be addressable and may report an operational status to an external device when polled, e.g., by the controller.

The at least one cable interconnecting the light modules with one another and the base station may be of any suitable size, shape and form.

Generally, the cable may of a suitable form to supply power from the base station to each light module and for relaying data between the controller via the base station and each light module.

The at least one cable may be an electrical cable, a fibre-optic cable, a networking cable, an instrumentation cable, or any combination thereof.

Typically, the at least one cable may be in the form of an electrical cable, preferably a four-core control cable.

In some embodiments, the at least one cable may include an outer layer or sleeve for protecting one or more electrical wires and/or fibre optic cables extending within and along the cable. The outer layer or sleeve may be formed from durable plastic or rubber material or materials. For example, the outer sleeve may be formed from nylon, polyurethane, polyethylene, polyvinyl chloride, or synthetic or natural rubbers.

In some embodiments, the at least one cable may be a multi-layered cable. For example, the cable may include at least one reinforcing layer or sleeve. The reinforcing layer or sleeve may include fibre cord, for example. Each reinforcing layer may include a mesh.

In preferred embodiments, the at least one cable may include multiple segments of cable for interconnecting the light modules and the base station.

Each segment may include a pair of opposed ends each configured to connect or couple with a cable port associated with a light module and/or the base station.

Each end may typically include an electrical connector configured to connect with the electrical connector associated with each cable port, typically the electrical connector may be a DEUTSCH connector or an IP65 connector.

The multiple segments of cable may preferably by provided in a range of lengths to suit light module spacing requirements.

As indicated, the system includes a controller operatively associated with the base station and configured to selectively activate the at least one visual signal of any one of the light modules when an abnormal or emergency environmental condition is detected.

In some embodiments, the controller may be associated with the base station. For example, the controller may form part of the base station. In such embodiments, the base station may further include at least one display and a keypad or touchpad to allow a user to interact with the controller and control various aspects of functionality of the system.

In other embodiments, the controller may be a remote controller that may wirelessly connect with at least the base station.

In some such embodiments, the remote controller may include an external processing device, including one or more processors and one or more memory units containing executable instructions/software to be executed by the one or more processors, such as, e.g., a computer, a tablet, a smart phone, a smart watch or a PDA.

In other such embodiments, the remote controller may be a remotely accessible server. The at least one remotely accessible server may be any appropriate server computer, distributed server computer, cloud-based server computer, sever computer cluster or the like. The server may also typically include one or more processors and one or more memory units containing executable instructions/software to be executed by the one or more processors.

The controller may preferably include software configured to run on the controller and enable a user to interact with the system and control various aspects of functionality of the system.

The software may preferably be interactive.

In some embodiments, the software may be in the form of an application (i.e., an app) configured to run on a user's external processing device.

In other embodiments, the remotely accessibly server may include a web server providing a graphical user interface through which a user may interact with the system and the remotely accessible server.

A user may interact with the software to configure a desired light colour for a specific environmental condition or event. Likewise, the user may interact with the software to input one or more evacuation pathways from the underground passageway so that the light modules may be used to direct miners or operations personnel along the one or more evacuation pathways.

A user may also interact with the software to manually and selectively activate the at least one visual signal of any one light modules. For example, a section or portion of an underground passageway may need to be closed off for maintenance work or other non-emergency work. In such scenarios, the user may selectively activate the at least one visual signal of the light modules corresponding to the section or portion of the underground passageway to emit a constant red light. In some such scenarios, the user may selectively activate the corresponding light modules to emit a flashing red light that sequentially flashes away from the section or portion of the underground passageway to direct miners and operations personnel away from the section or portion.

The software may enable a user to select which sensors to communicate with and monitor. The sensor may preferably include a wireless communications module enabling the controller to wirelessly connect with the sensor. The sensor may be a smoke sensor, a gas sensor, a seismic activity sensor, a subsidence monitoring device, a pore water pressure measuring device or any other type of sensor.

The software may continuously collect data from the at least one sensor and monitor the data collected for any change indicative of an abnormal or emergency environmental condition.

The software may also continuously collect data from the base station and the plurality of light modules and monitor the data collected for any changes indicative of an abnormal operating condition or failure. For example, the software may monitor the remainder of the system for failures including an open circuit, a short circuit, a primary input power source failure, a UPS system failure (e.g., battery backup voltage), or an internal body temperature of the base station.

The software may also perform maintenance checks on the base station and the light modules. For example, the software may temporarily isolate the base station from the primary input power source to check the operating condition of the UPS system. Likewise, the software may temporarily isolate any one light module from the base station to check the operating condition of a light module's redundant power source.

In some embodiments, the lighting system may include a renumbering mode for determining a position of a light module in the serial arrangement. Typically, such a mode may be initiated when a light module is damaged or when the number of light modules change as cave front progresses, for example, to ensure the system may continue to selectively activate the at least one visual signal of any one of the light modules when an abnormal or emergency said environmental condition is detected or upon receiving a manual command.

Typically, each light module may be assigned a sequentially numbered position in the serial arrangement, such as, e.g., 1, 2, 3, 4, etc. When the renumbering mode is initiated, the controller of the system may delete any previously numbered positions. The controller may then issue a first position command and poll the first light module in the serial arrangement. Responsive to the first light module reporting, the controller may assign a 1 position to the first light module. The controller may then issue a second position command and poll the next light module in the serial arrangement. Again, responsive to the next light module reporting, the controller may assign a 2 position to the next light module. In this fashion, the renumbering mode may sequentially assign a positional number to each light module in the serial arrangement.

In some embodiments, the renumbering mode may be manually initiated by a user via a software interface. In other embodiments, the system may initiate the renumbering mode, For example, the system may initiate the renumbering mode upon detecting a communication fault along a serial arrangement of light modules, upon detecting a change in the number of light modules in a serial arrangement and/or at regular intervals.

According to a fifth aspect of the present invention, there is provided a method of alerting a person in an underground passageway of an event, said method including:

- providing a base station having at least one power supply at or near an end of the passageway;
- providing a plurality of light modules extending from the base station and spaced at least partially along a length of the passageway, said light modules being interconnected with the base station and the power supply by at least one cable, each light module being capable of emitting light for ordinary operations and at least one visual signal for alerting the person of the event; and
- continuously monitoring data from at least one sensor configured to sense an environmental condition within or near the underground passageway and selectively activating the at least one visual signal of any one of the light modules when an emergency or abnormal said environmental condition is detected.

The method may include one or more features or characteristics of the system as herein before described.

The event may be an emergency event or a non-emergency event.

Examples of emergency events may include seismic activity, fire, explosions, mud rush, gas leaks and/or other geotechnical events that may be hazardous to miner and other operations personnel within the vicinity.

Examples of non-emergency events may include the desired temporary closure of particular work areas due to work scheduling, movement of large machinery and/or other like non-hazardous events.

The continuously monitoring data may preferably occur via the controller operatively associated with the base station. The controller may preferably be in the form of a remotely accessible server in wireless communication with at least the base station and the at least one sensor, preferably via a wireless network.

During normal operations, the light modules may emit white light to assist miners and other operations personnel in undertaking their usual work within the underground passageway. The white light may be a cool white or a warm white light.

Responsive to the emergency or abnormal said environmental condition being detected, the at least one visual signal may be selectively activated to emit a green or red light and the light may be a constant light or a flashing light.

For example, in some embodiments, when the emergency or abnormal said environmental condition is detected near the underground passageway but the passageway is deemed safe, the at least one visual signal may be selectively activated to emit a constant green light.

Conversely, in other embodiments, when the emergency or abnormal said environmental condition is detected near or within the underground passageway and the passageway is deemed unsafe, the at least one visual signal may be selectively activated to emit a constant red light.

In yet other embodiments, when the emergency or abnormal said environmental condition is detected near or within the underground passageway and the passageway is deemed unsafe, the at least one visual signal of the light modules may be selectively activated to emit flashing red light in a coordinated and sequential manner to direct a person towards a safe zone or away from the detected emergency or abnormal said environmental condition.

In yet further embodiments, when the emergency or abnormal said environmental condition is detected near or within the underground passageway and the passageway is deemed unsafe, the at least one visual signal may be selectively activated to emit a flashing red light.

In yet further embodiments, when the emergency or abnormal said environmental condition is detected within or adjacent only a portion of the underground passageway but a remainder of the passageway is deemed safe, the at least one visual signal of the light modules corresponding to the portion of the underground passageway may be selectively activated to emit a constant or flashing red light whereas the at least one visual signal of the light modules corresponding to the remainder of the passageway may be selectively activated to emit a constant green light.

In such embodiments, the flashing red lights may flash in a sequential manner to direct the person away from the affected portion of the passageway.

In such embodiments, the portion of the underground passageway affected by the emergency or abnormal environmental condition may be defined by a predefined exclusion zone around the location where the condition was detected. The predefined exclusion zone may be inputted by a user and may be defined according to local standards and/or regulations, such as, e.g., a 50 m, a 100 m, a 150 m, a 200 m, a 250 m or a 300 m exclusion zone or more around a localised emergency or abnormal environmental condition detected.

Definitions of specific embodiments of the invention as claimed herein follow.

According to a first embodiment, there is provided a lighting system for use along a length of an underground passageway, the system including:

a base station located at or near an end of the length of the passageway, said base station including at least one power source;

a plurality of light modules extending from the base station in a serial arrangement and spaced at least partially along the length, each light module configured to emit light for ordinary operations within the passageway and at least one visual signal;

at least one cable extending from the base station and interconnecting the light modules with the base station and the power source; and a controller operatively associated with the base station, said controller being in communication with at least one sensor configured to sense an environmental condition, said controller configured to continuously monitor said sensor and selectively activate the at least one visual signal of any one of the light modules when an abnormal or emergency said environmental condition is detected and upon receiving a manual command, wherein the light emitted for ordinary operations is white light and the at least one visual signal is a flashing or constant non-white light, and wherein the light modules are configured to flash the at least one visual signal in a sequential and coordinated pattern to direct a person away from the abnormal or emergency said environmental condition.

According to a second embodiment, there is provided a light module for use with the lighting system of the first embodiment, said light module configured to be arranged with other like light modules in a spaced and serial arrangement at least partially along a length of any underground passageway, said light module capable of emitting light for ordinary operations within the passageway and at least one visual signal, wherein the light emitted for ordinary operations is white light and the at least one visual signal is a flashing or constant non-white light, and wherein the light module together with the other like light modules is configured to flash the at least one visual signal in a sequential and coordinated pattern to direct a person away from an abnormal or emergency said environmental condition.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

FIGS. 1 to 8 show embodiments of a lighting system (100) and parts thereof for lighting a length of an underground passageway (900) and for providing a visual signal when an abnormal or emergency environmental condition is detected.

Figure 1:
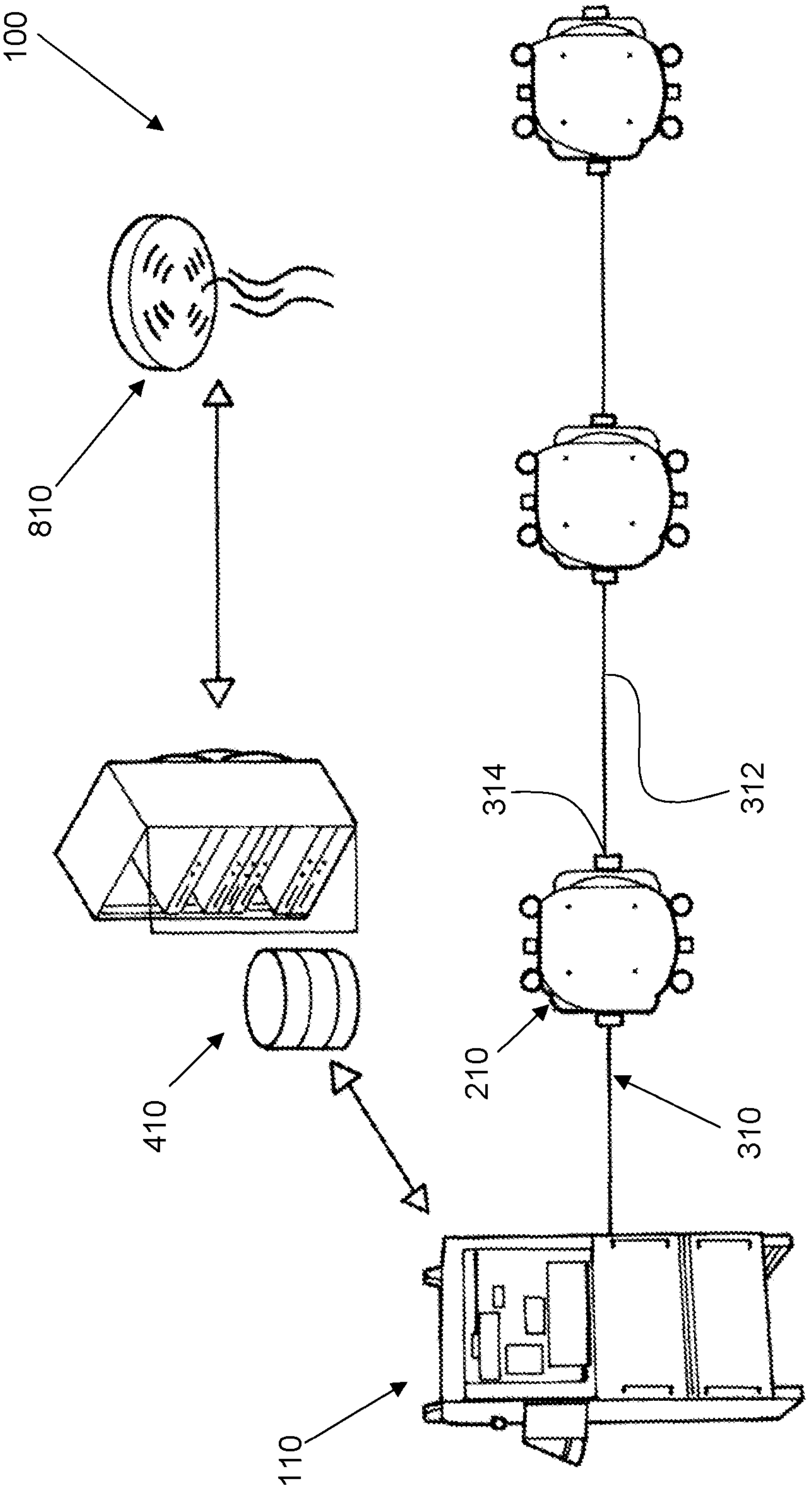
FIG. 1 is a schematic showing a lighting system according to an embodiment of the present invention.

Referring to FIG. 1, the lighting system (100) includes a base station (110) configured to be located at or near an end of a length of an underground passageway; a plurality of light modules (210) extending from the base station (110) in a serial arrangement and spaced at least partially along the length of the underground passageway, each light module (210) configured to emit light for ordinary operations within a passageway and at least one visual signal; at least one cable (310) extending from the base station (110) and interconnecting the light modules (210) with the base station (110); and a controller (410) in the form of a remotely accessible server operatively associated with the base station (110). The controller (410) being in communication with the base station (110) and at least one sensor (810) configured to sense an environmental condition. The controller (410) being configured to continuously monitor the sensor (810) and selectively activate the at least one visual signal of any one of the light modules (210) when an abnormal or emergency environmental condition is detected.

In this embodiment, the system (100) includes five light modules (210) for spanning at least partially along a length of an underground passageway. The light modules (210) are spaced at regular intervals of about 20 m from one another.

The at least one cable (310) interconnecting the light modules (210) with one another and the base station (110) is in the form of an electrical cable capable of supplying power from the base station (110) to each light module (210) and for relaying data between each light module (210) and the base station (110).

As shown, the at least one cable (310) includes multiple segments (312) of cable (310) for interconnecting the light modules (210) and the base station (110).

Each segment (312) includes a pair of opposed ends configured to connect or couple with a cable port (not shown) associated with a light module (210) and/or the base station (110).

Each end includes an electrical connector (314) configured to connect with an electrical connector associated with each cable port.

Each light module (210) includes a plurality of LEDs capable of emitting white light for ordinary operations and at least one visual signal in the form of a green or red light when an abnormal or emergency environmental condition is detected. The visual signal can be a constant or flashing light depending on the type of abnormal or emergency environmental condition detected and the location of the condition detected.

For example, the visual signal can be a constant red light to indicate a hazardous zone or no-entry zone. Moreover, the visual signal can be a flashing red light to indicate that the zone should be immediately evacuated.

Conversely, the visual signal can be a constant green light to indicate a non-hazardous zone or safe zone.

In some scenarios, the light modules (210) of the system (100) can emit a coordinated sequential flashing light to indicate that the area should be evacuated in a particular direction towards a non-hazardous "green" zone. For example, the light modules (210) can emit a flashing red light in a sequential manner towards or away from the base station (110) to indicate that a person should evacuate the zone by either heading towards or away from the base station (110).

In yet other scenarios, the light modules (210) of the system (100) can emit a mixture of visual signals to alert a user when a portion or segment of an underground passageway should be vacated or evacuated but a remainder of the underground passageway is safe. For example, the light modules (210) in the affected portion or segment of the underground passageway can be selectively activated to emit a constant or flashing red light indicative that the area should be vacated and the light modules (210) in the unaffected portion or segment of the underground passageway can be selectively activated to emit a constant green light indicative that the area is safe.

Figure 2A:
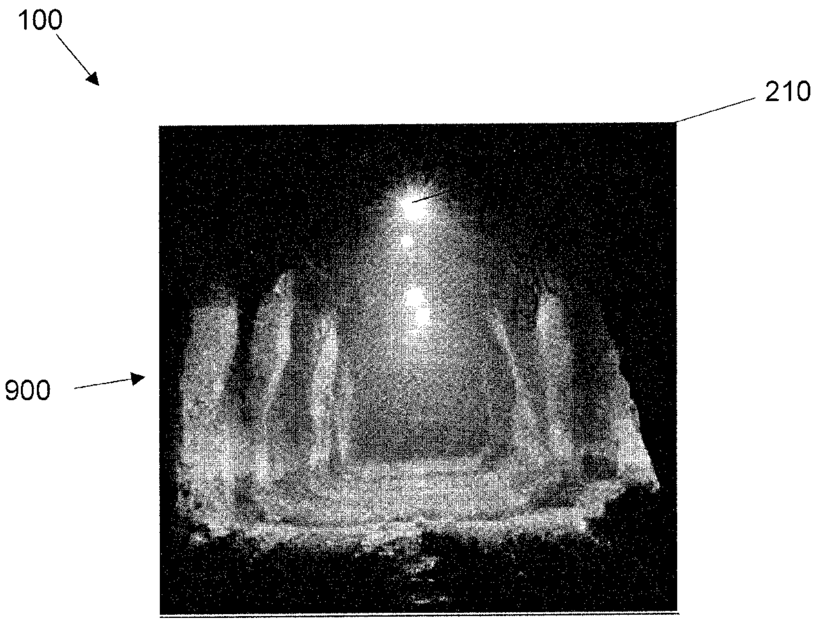
FIGS. 2A and 2B are photographs showing the lighting system of FIG. 1 installed within an underground passageway and respectively indicating when the underground passageway is safe and unsafe.
Figure 2B:
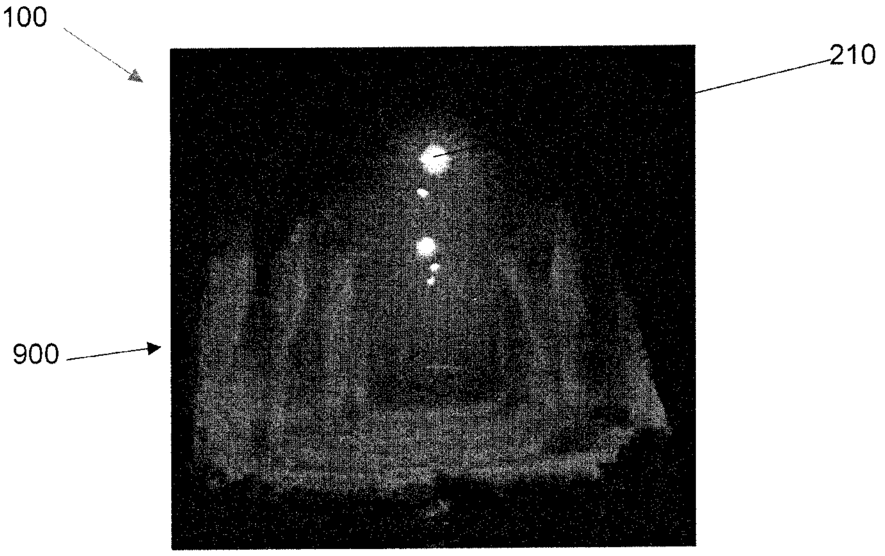

Referring briefly to FIGS. 2A and 2B, these figures respectively show a plurality of the light modules (210) of the system (100) extending along a length of an underground passageway (900).

In FIG. 2A, the light modules (210) are shown emitting a visual signal in the form of a constant green light to indicate that the underground passageway (900) is a safe zone. In such a scenario, an abnormal or emergency environmental condition, such as, e.g., a gas leak, a mud rush, a fire, an explosion or seismic activity, has been detected a safe distance further along the same underground passageway (900) or within an adjacent underground passageway (900).

In contrast in FIG. 2B, the light modules (210) are shown emitting a visual signal in the form of a constant red light to indicate that the underground passageway (900) is a hazardous zone or no-entry zone. In such a scenario, the abnormal or emergency environmental condition has been detected in or near the underground passageway (900) and the area is deemed hazardous.

Figure 3:
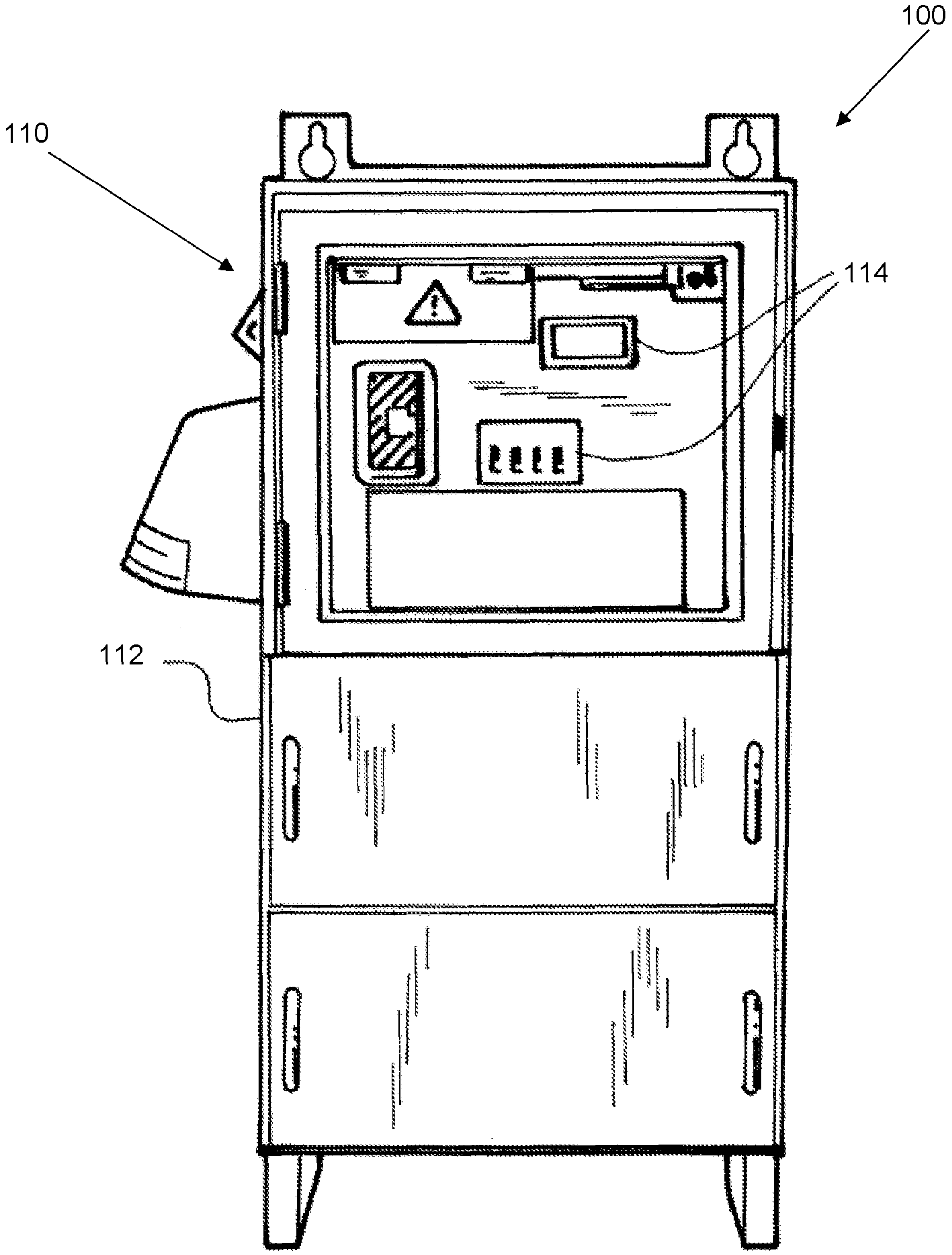
FIG. 3 is a photograph showing a base station of the lighting system shown in FIG. 1.

Referring to FIG. 3, the base station (110) is configured to be located at or near a first end of the length of an underground passageway so that the light modules (210; not shown) can extend from the base station (110) in a serial arrangement at least partially towards a second end of the length.

The base station (110) includes a body (112) sized and shaped for housing components and/or parts of the system (100).

The body (112) is adapted to be mounted to a sidewall of a passageway such that the base station (110) is at a height for convenient access by miners or operations personnel.

The body (112) includes an access door or panel for accessing internal contents of the base station (110).

The body (112) includes externally visible LEDs (114) for indicating an operational status of the system (100).

The body (112) includes four cable ports (not shown) each including an electrical connector for connecting the light modules (210; not shown) with the base station (110) via segments (312; not shown) of the cable (310; not shown).

The body (112) of the base station (110) is connected to a primary input power source, such as, e.g., a generator or a mains power supply. However, the body (112) also houses a second redundant power source in the form of an uninterruptible power source (UPS) system including one or more batteries for supplying power to the light modules (210; not shown) and other electrical components of the system (100) when the primary input power source fails.

The UPS system is a line-interactive system further including a charger for charging the one or more batteries during normal operation. When the primary input power source fails, backup power circuitry redirects power from the one or more batteries to supply power to a remainder of the system (100).

The UPS system provides a run time of at least 4 hours when the primary input power source fails.

The base station (110) includes a communications module for connecting the base station to the controller (410; not shown). The communications module is in the form of a modem enabling the base station to connect to the controller (410; not shown) via a wired or wireless network (e.g., Wi-Fi (WLAN) communication, Satellite communication, RF communication, infrared communication, or Bluetooth™).

The body (112) of the base station (110) includes an Ethernet port for connecting to a wired network for communication with the controller (410; not shown).

The base station (110) further includes a microcomputer, including one or more processors and a memory. The processors include multiple inputs and outputs coupled to other electronic components of the system (100), including, but not limited to, the communications module and the light modules (210; not shown).

The base station (110) is addressable and reports an operational status to an external device when polled, e.g., by the controller (410; not shown).

Figure 4A:
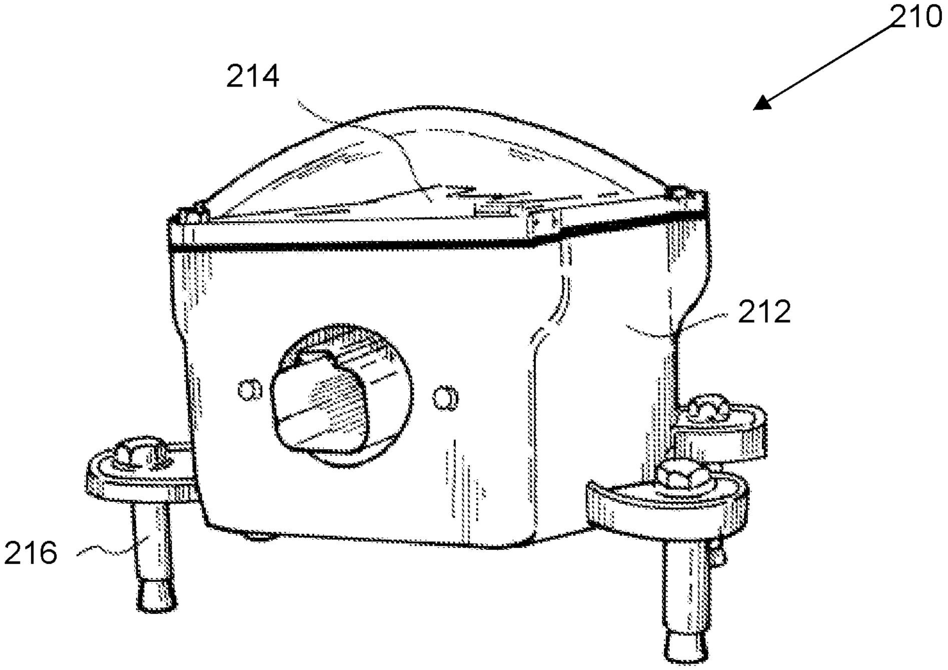
FIGS. 4A and 4B are photographs respectively showing a perspective view and exploded view of a light module of the lighting system as shown in FIG. 1.
Figure 4B:
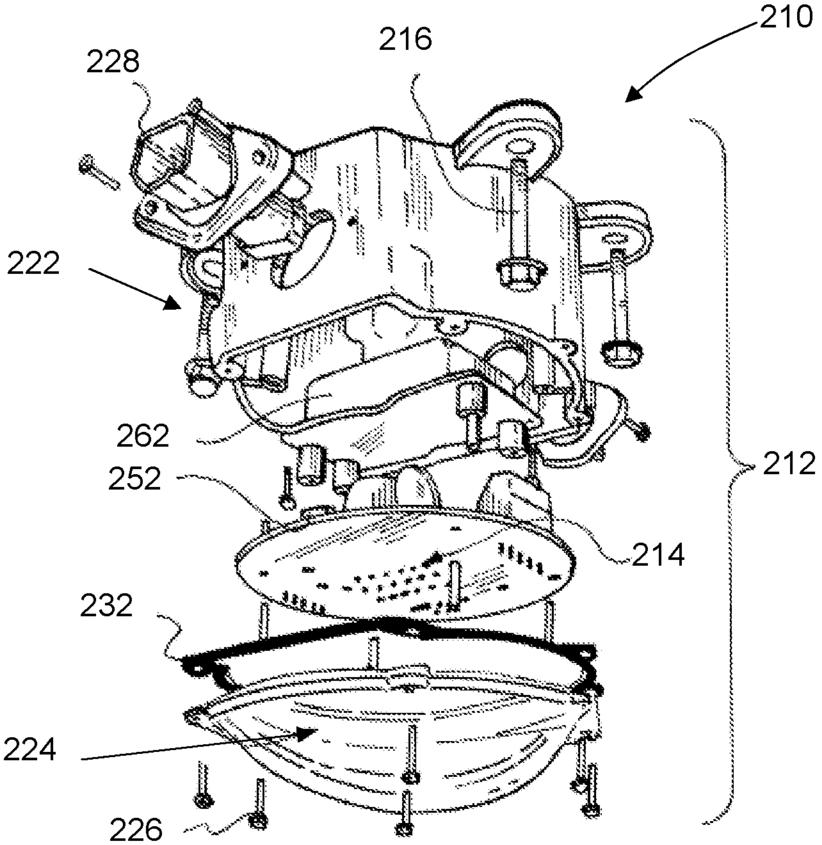

FIGS. 4A and 4B respectively show an assembled and exploded view of a light module (210).

The light module (210) includes a body (212) configured to house a plurality of LEDs (214) capable of emitting white light for ordinary operations and at least one visual signal in the form of a green or red light, and other components of the light module (210). The body (212) is configured to be mounted to a wall or ceiling of an underground passageway via four rock anchors (216).

Generally, the body (212) is formed from material or materials capable of withstanding the rigorous conditions of an underground mine. Typically, the body (212) is formed from durable plastic material or materials that are substantially shock resistant, high and/or low temperature resistant, pressure resistant and waterproof.

Referring to FIG. 4B, the body (212) includes a rear portion (222) and an attachable opposed front cover (224).

The rear portion (222) includes a planar rear plate, a rim and at least one sidewall extending from an outer edge of the rear plate to the rim. The rear portion is detachably mounted to the wall or ceiling of the passageway via the four rock anchors (216).

The front cover (224) is substantially dome-shaped and is substantially transparent to enable light to pass through.

The at least one sidewall includes a pair of cable ports with associated electrical connectors (228) for interconnecting the light module (210) with the base station (110; not shown) and other light modules (210) via segments (312; not shown) of the cable (310; not shown). The cable ports with associated electrical connectors (228) are located on diametrically opposite sides of the body (212) to assist in connecting the light modules (210) in a serial arrangement.

The rear portion (222) and the front cover (224) are fastened together with threaded fasteners (226).

As shown, a gasket (232) extends along a rim of the front cover (224) to assist in forming a substantially water-tight seal between the front cover (224) and the rear portion (222).

The plurality of LEDs (214) are arranged in an array including a mixture of LEDs capable of emitting light in different colours. The plurality of LEDs (214) includes 18 LEDs arranged in an array, including two redundant banks of 9 LEDs each. Each bank of LEDs includes red LEDs, green LEDs and white LEDs.

Each light module (210) includes a dedicated microprocessor operatively associated with the plurality of LEDs (214) for controlling operation of LEDs (214) in response to receiving instructions from the controller (410; not shown) or the at least one sensor (810; not shown).

Each light module (210) is generally connected to the controller (410; not shown) via the base station (110; not shown) by an electrical circuit extending along the at least one cable (310; not shown).

Each light module (210), however, further include a wireless communications module (252), such as, e.g., a wireless network interface controller, such that the light module (210) can wirelessly connect to an external device, such as, e.g., the controller (410; not shown) via a wireless network (e.g., Wi-Fi (WLAN) communication, Satellite communication, RF communication, infrared communication, or Bluetooth™). Advantageously, the wireless communications module provides a redundant wireless communications path in the event of cable damage connecting the light module (210) to the base station (110).

The light module (210) further includes a redundant power source for powering the plurality of LEDs (214) and other electrical components of the light module (210) in the event of cable damage connecting the light module (210) to the power source associated with the base station (110). The redundant power source includes an on-board power source in the form of a rechargeable battery (262).

Each light module (210) is addressable and will report an operational status to an external device when polled, e.g., by the controller (410; not shown).

Referring back to FIG. 1, the system (100) includes a controller (410) in the form of a remotely accessible server operatively associated with the base station (110). The controller (410) is in communication with at least one sensor (810) configured to sense an environmental condition and configured to continuously monitor the sensor (810) and selectively activate the at least one visual signal of any one of the light modules (210) when an abnormal or emergency environmental condition is detected.

The remotely accessible server includes one or more processors and one or more memory units containing executable instructions/software to be executed by the one or more processors.

The controller (410) includes software configured to enable a user to interact with the system (100) and control various aspects of functionality of the system (100).

The software is interactive. The remotely accessibly server includes a web server providing a graphical user interface through which a user may interact with the system (100) and the remotely accessible server.

For example, a user can interact with the software to configure a desired light colour for a specific environmental condition or warning. Likewise, the user can interact with the software to input one or more evacuation pathways from the underground passageway so that the light modules (210) may be used to direct miners or operations personnel along the one or more evacuation pathways.

The software further enables a user to select which sensor (810) to communicate with and monitor. The sensor (810) includes a wireless communications module enabling the controller (410) to wirelessly connect with it. The sensor (810) can include a smoke sensor, a gas sensor, a seismic activity sensor, a subsidence monitoring device, a pore water pressure measuring device or any other type of sensor (810).

The controller (410) continuously collects data from the sensor (810) and monitors the data collected for any change indicative of an abnormal or emergency environmental condition.

The controller (410) also continuously collects data from the base station (110) and the plurality of light modules (210) and monitors the data collected for any changes indicative of an abnormal operating condition or failure. For example, the software can monitor a remainder of the system (100) for failures including an open circuit, a short circuit, a primary input power source failure, a UPS system failure (e.g., battery backup voltage), or an internal body temperature of the base station (110).

The software performs maintenance checks on the base station (110) and the light modules (210). For example, the software can temporarily isolate the base station (110) from the primary input power source to check the operating condition of the UPS system. Likewise, the software can temporarily isolate any one light module (210) from the base station (110) to check the operating condition of a light module's (210) redundant power source. The maintenance checks may be performed on command or be scheduled.

Figure 5:
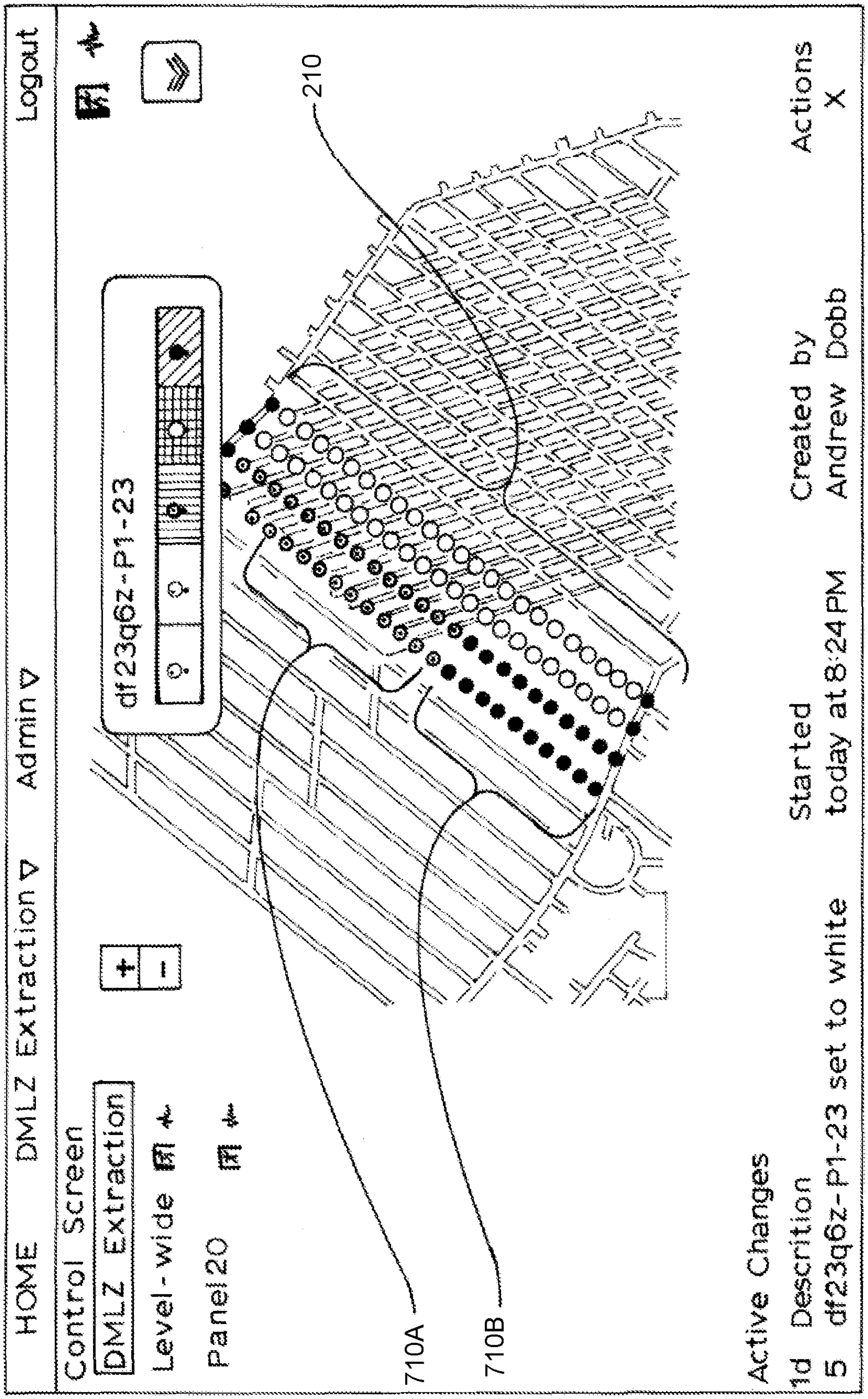
FIG. 5 is an illustration of a screenshot of an application for controlling the system as shown in FIG. 1.

Referring to FIG. 5, this figure shows a screen-shot of the software of the controller (410; not shown).

Specifically, the figure shows that the visual signals for a portion (710A) of the light modules (210) spaced along the underground passageway have been selectively activated to emit a constant red light indicative that the segment of the passageway corresponding to the portion (710A) is unsafe or hazardous. The figure also shows that the visual signals for an adjacent portion (710B) of the other light modules (210) have been selectively activated to emit a constant green light indicating that the remainder of the respective passageways is safe.

Figure 6:
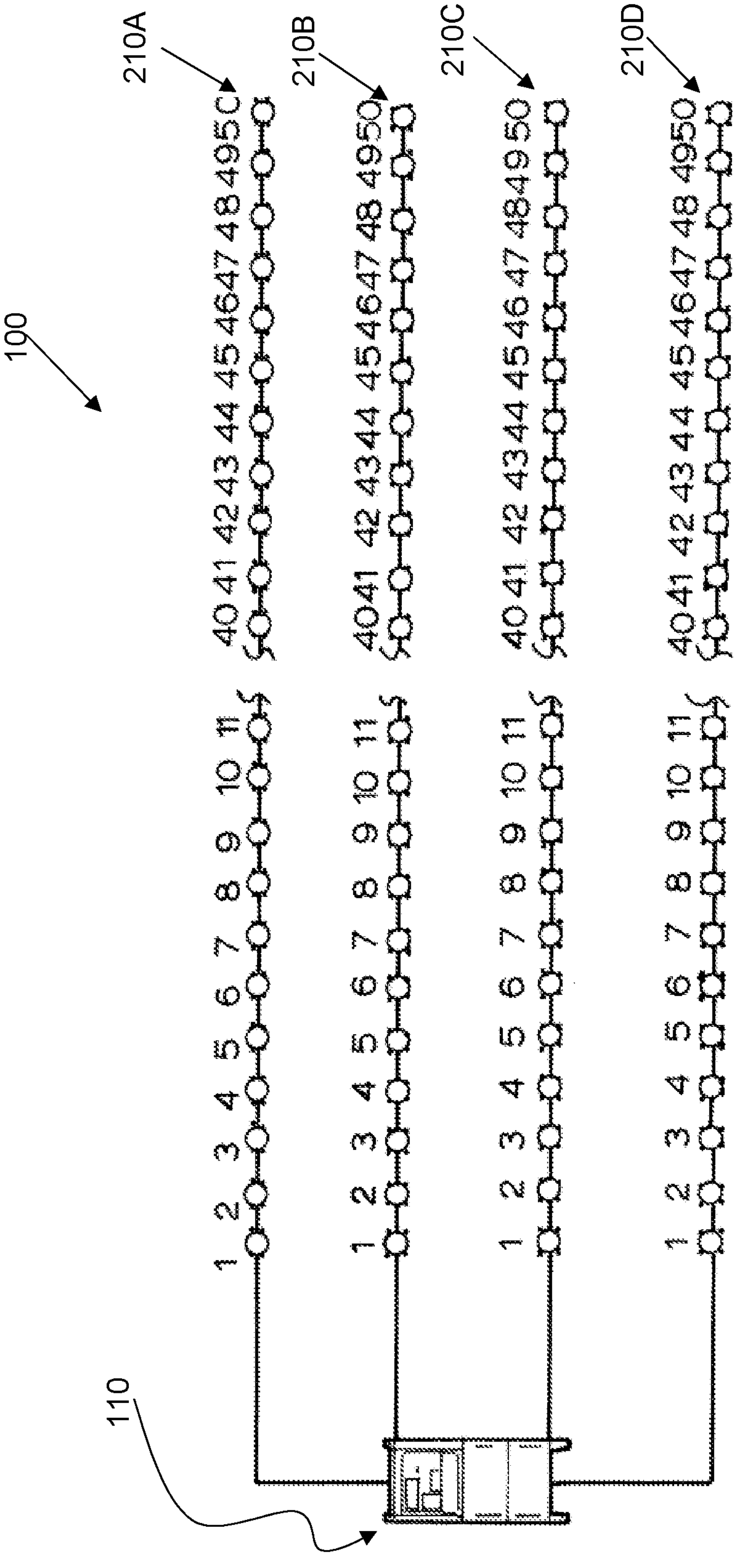
FIG. 6 is a schematic showing the lighting system according to another embodiment of the present invention.

Referring to FIG. 6, this figure shows another embodiment of the system (100) in which four lines or pluralities of light modules (210A, 210B, 210C, 210D) each extend from the base station (110). In such embodiments, the base station (110) is usually located at a junction of the passageways and each line or plurality of light modules (210A, 210B, 210C and 210D) can extend from the base station (110) and at least partially along a respective underground passageway.

Figure 7:
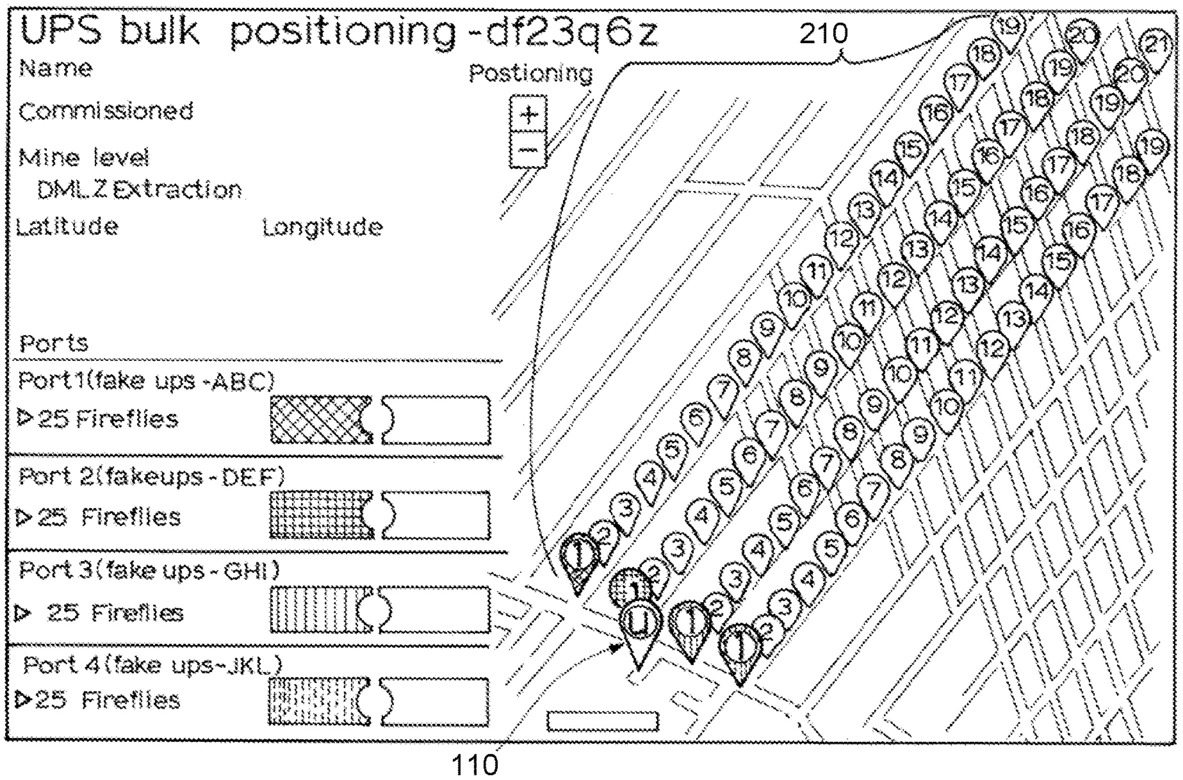
FIG. 7 is an illustration of a screenshot of the application for controlling the system as shown in FIG. 6.

Referring to FIG. 7, this figure shows a screen-shot of the software of the controller (410; not shown) for controlling operation of the system (100; not shown).

In this embodiment, the screen-shot is showing a graphical representation of the status of light modules (210) associated with a single base station (110).

Figure 8:
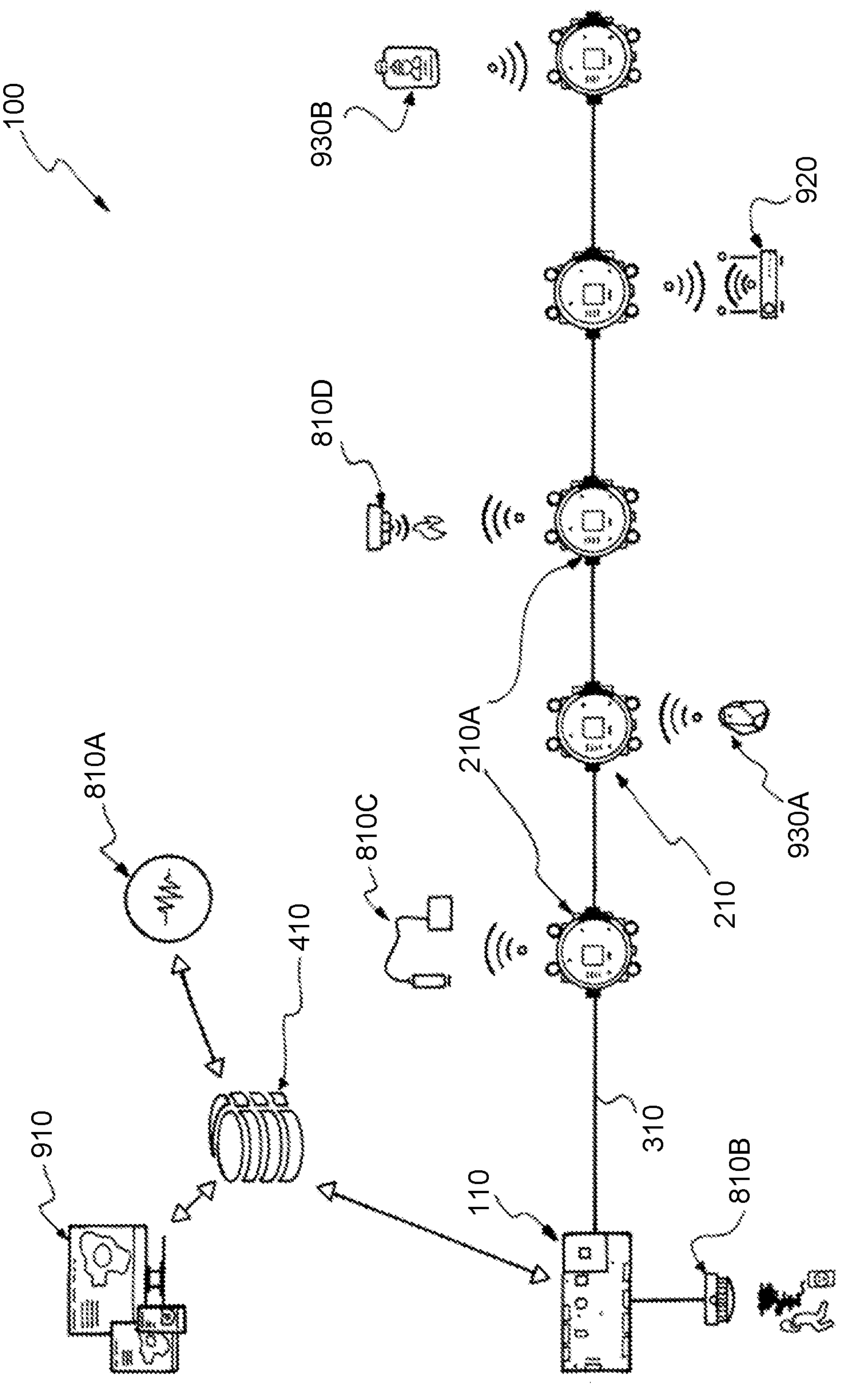
FIG. 8 is a schematic showing the lighting system according to anther embodiment of the present invention.

FIG. 8 shows another embodiment of the lighting system (100) as shown in FIG. 1.

In this embodiment, the system (100) includes a base station (110) configured to be located at or near an end of a length of an underground passageway, a plurality of light modules (210) extending from the base station (110) in a serial arrangement and spaced at least partially along the length of the underground passageway, at least one cable (310) extending from the base station (110) and interconnecting the light modules (210) with the base station (110); and a controller (410) in the form of a remotely accessible server operatively associated with the base station (110). The controller (410) includes software (910) enabling a user to interact with the system (100).

As shown, the controller (410) is in communication with a first sensor (810A) being a seismic activity sensor, the base station (110) is in communication with a second sensor (810B) being a gas sensor, and two of the light modules (210A) are in wireless communication with a third and fourth environmental sensor (810C, 810D).

Advantageously, the wireless communications modules (252; not shown) of each light module (210) enable the light modules (210) to wirelessly connect to the wireless third and fourth environmental sensor (810C, 810D) as well as other wireless networks (920).

Additionally, each light module (210) in this embodiment further includes a RFID reader for interrogating RFID tags (930A, 930B) that pass through an interrogation zone associated with each light module (210). Advantageously, this enables the light modules (210) of the system (100) to identify the location of an RFID tag (930A, 930B) associated with a person, vehicle, or mining asset in the passageway.

A method of using the system (100) to alert a person in an underground passageway will now be described in detail with reference to FIGS. 1, 2A and 2B.

Referring to FIG. 1, as an initial step, the system (100) is installed at least partially along a length of the underground passageway with the base station (110) being located at one end of the length and the plurality of light modules (210) extending from the base station (110) at least partially towards the other end. The light modules (210) are arranged serially one after another at regular intervals of 20 m from one another.

Once installed, the controller (410), which is operatively associated with the base station (110), continuously monitors the sensor (810) that is configured to sense an environmental condition near or within the underground passageway.

Referring to FIG. 2B, when an abnormal or emergency environmental condition is detected, the controller (410) selectively activates the visual signal of the light modules (210) within a predefined radius of the location where the abnormal or emergency environmental condition is detected to emit a constant red light to alert miners and other operations personnel within the vicinity that the zone is hazardous and unsafe.

Referring to FIG. 2A, the controller (410) further activates the visual signal of the light modules (210) outside the predefined radius of the location where the abnormal or emergency environmental condition is detected to emit a constant green light to alert miners and other operations personnel that the zone is safe (i.e., a green zone).

In some instances, the light modules (210) within the predefined radius of the location where the abnormal or emergency environmental condition is detected can emit a flashing or pulsing red light to also direct miners and other operations personnel within the vicinity away from the hazardous and unsafe zone towards a green zone.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A dynamic lighting system for use along a length of an underground passageway, the system comprising:

a base station comprising at least one power source;

a plurality of light modules extending from the base station in a serial arrangement and spaced at least partially along the length, each light module configured to emit light for ordinary operations within the passageway and at least one visual signal;

at least one cable extending from the base station and interconnecting the light modules with the base station and the power source;

a controller operatively associated with the base station, said controller being in communication with at least one sensor configured to sense an environmental condition, said controller configured to continuously monitor said sensor and selectively activate the at least one visual signal of any one of the light modules when an abnormal or emergency said environmental condition is detected; and each said light module further comprising a redundant wireless communications module, a redundant power source and a dedicated microprocessor operatively associated with the at least one visual signal enabling operation of the at least one visual signal in response to receiving wireless instructions from the controller should the at least one cable connecting the light module to the base station be damaged or severed, wherein the light emitted for ordinary operations is white light and the at least one visual signal is selectable from a flashing non-white light and a constant non-white light, and wherein, when said at least one visual signal is a flashing non-white light, the light modules are configured to flash the at least one visual signal relative to one another in a sequential and coordinated pattern to direct a person away from the abnormal or emergency said environmental condition.

2. The lighting system of claim 1, wherein the at least one visual signal can be selectively activated by the controller on receiving a manual command from an operator.

3. The lighting system of claim 1, wherein the non-white light is a green light or a red light.

4. The lighting system of claim 1, wherein the at least one visual signal is selectively activated to alert a person within the underground passageway that at least a portion of the underground passageway has been affected by the abnormal or emergency said environmental condition detected.

5. The lighting system of claim 4, wherein the at least one visual signal is a constant red light.

6. The lighting system of claim 1, wherein the at least one visual signal is selectively activated to alert a person within the underground passageway that at least a portion of the underground passageway has been unaffected by the abnormal or emergency said environmental condition detected.

7. The lighting system of claim 6, wherein the at least one visual signal is a constant green light.

8. The lighting system of claim 1, wherein the at least one visual signal is selectively activated to direct the person within the underground passageway to move towards at least a portion of the underground passageway unaffected by the abnormal or emergency said environmental condition detected.

9. The lighting system of claim 8, wherein the at least one visual signal of the light modules flash a green light in a sequential and coordinated pattern towards the at least a portion of the underground passageway unaffected by the abnormal or emergency said environmental condition detected.

10. The lighting system of claim 1, wherein the environmental condition is selected from a fire, an explosion, a gas leak, a toxic or flammable fluid leak, a mud rush, ground subsidence and seismic activity.

11. The lighting system of claim 1, wherein the at least one power source is a mains power supply.

12. The lighting system of claim 1, wherein the base station further comprises an uninterruptible power source configured to be invoked when the at least one power source fails.

13. A method of alerting a person in an underground passageway of an event, said method comprising:

providing a dynamic lighting system according to claim 1; and continuously monitoring data from at least one sensor in communication with the controller, said at least one sensor configured to sense an environmental condition within or near the underground passageway, said controller, responsive to receiving data from the at least one sensor, configured to selectively activate the at least one visual signal of any one of the light modules when an emergency or abnormal said environmental condition is detected, wherein the light emitted for ordinary operations is white light and the at least one visual signal is selectable from a flashing non-white light and a constant non-white light, and wherein, when said at least one visual signal is a flashing non-white light, the light modules are configured to flash the at least one visual signal relative to one another in a sequential and coordinated pattern to direct a person away from the abnormal or emergency said environmental condition.

14. The method of claim 13, wherein the controller is a remotely accessible server in wired or wireless communication with the base station.

15. The method of claim 13, wherein responsive to the emergency or abnormal said environmental condition being detected, the at least one visual signal is selectively activated to emit a green or red light depending on a location of the emergency or abnormal said environmental condition detected relative to the underground passageway.

* * * * *